United States Patent [19]

Dalrymple et al.

[11] Patent Number: 5,305,237
[45] Date of Patent: Apr. 19, 1994

[54] METHOD AND APPARATUS FOR MONITORING A FLOWABLE MATERIAL IN A TRANSPORTABLE VESSEL

[75] Inventors: Thomas H. Dalrymple, Crown Point, Ind.; Buford R. Jean, Round Rock; Tom L. Erb; Frederick L. Whitehead, both of Austin, all of Tex.

[73] Assignee: Union Tank Car Company, East Chicago, Ind.

[21] Appl. No.: 729,457

[22] Filed: Jul. 12, 1991

[51] Int. Cl.$^5$ ............................................. G01F 23/00
[52] U.S. Cl. .................................. 364/562; 73/290 B; 324/644; 342/124; 364/509; 364/550
[58] Field of Search ............... 364/562, 561, 560, 465, 364/509, 510, 424.01, 550, 564, 551.01; 342/124; 324/644; 73/290 V, 290 B, 290 R; 343/720

[56] References Cited

U.S. PATENT DOCUMENTS

| | | | |
|---|---|---|---|
| 4,044,355 | 8/1977 | Edvardsson | 342/124 |
| 4,566,321 | 1/1986 | Zacchio | 324/644 X |
| 4,977,528 | 12/1990 | Norris | 364/509 X |
| 5,070,730 | 12/1991 | Edvardsson | 342/124 X |
| 5,115,218 | 5/1992 | Jean | 333/252 |
| 5,136,299 | 8/1992 | Edvardsson | 73/290 V X |

Primary Examiner—Jack B. Harvey
Assistant Examiner—Edward Pipala
Attorney, Agent, or Firm—Dressler, Goldsmith, Shore & Milnamow, Ltd.

[57] ABSTRACT

A method and system for monitoring the level of flowable material contained in a transportable vessel that utilizes microwave gauging technology. The system includes a microwave lens/seal assembly, a microwave transceiver assembly, a controller/processor assembly and a computer. The lens/seal assembly is permanently secured to the vessel. The microwave transceiver assembly is adapted to be releasably attached to the vessel. The controller/processor assembly and the computer may be located at a loading/unloading facility.

34 Claims, 4 Drawing Sheets

METHOD AND APPARATUS FOR MONITORING A FLOWABLE MATERIAL IN A TRANSPORTABLE VESSEL

FIELD OF THE INVENTION

The present invention relates to a method and apparatus for monitoring the level of flowable material contained in a transportable vessel that is located at a loading/unloading facility. More particularly, the invention relates to a method and system for monitoring the level of flowable material in a transportable vessel, such as a railway tank car, as the vessel is being loaded and unloaded, by economically utilizing microwave level detecting technology.

BACKGROUND OF THE INVENTION

The loading of railway tank cars with liquified gases under pressure, or flowable gases under pressure, or flowable materials for which it is necessary to exclude the escape of vapors, requires that the level of the flowable materials be measured within a sealed tank or vessel. It has been known in the art to utilize various types of mechanical float gauging devices and various types of electrical resistance gauging devices to monitor the level of flowable material being loading into a tank car. These devices generally have components that extend inside the vessel and require contact with the lading.

Microwave technology has been used to continually monitor liquid levels in a stationary vessel. An example of such a device is the CannonBear 1001 Microwave Level Transmitter manufactured by TN Technologies of Round Rock, Tex. This device includes a transceiver unit that is mounted on the top of the vessel and sends a low-level microwave beam toward the surface of liquid in the vessel. Microprocessor-based electronics calculate the time for the reflected signal to return to the transceiver unit to gauge the distance from the transceiver unit to the surface of the liquid in the vessel. The transceiver unit is permanently mounted to the outside of the vessel and a non-conductive and inert process seal or lens separates the transceiver unit from the vessel interior. The transceiver unit is connected to a transmitter electronics which may be remote from the transceiver. Each vessel has a process seal or lens and a transceiver unit permanently mounted thereto.

The advantage of utilizing microwave level transmitter technology to measure the level of flowable materials in a vessel is that no part of the system is in contact with the vessel contents. Also, process material coating, abrasion, temperature change, composition change, density change, and moisture change do not affect the measurement.

There is a need for an improved method and apparatus that utilizes known microwave gauging technology to monitor the level of flowable material contained in a transportable vessel during the loading and unloading thereof at a loading/unloading facility.

As used herein the term "transportable vessel" is intended to include railway tank cars, highway tank trailers, cargo tanks, and the like.

SUMMARY OF THE INVENTION

The method and apparatus of the present invention utilizes the concepts of known microwave gauging technology in a unique manner to economically, accurately and reliably monitor the level of flowable material contained in a transportable vessel, such as a railway tank car or the like. Although the disclosure of the invention will be made herein in connection with a railway tank car, it is understood that it is equally applicable for use in connection with other types of transportable vessels.

In accordance with a unique aspect of the invention, the portion of the system that is permanently attached to the tank car is minimized to enhance economics and reliability. More specifically, the system includes a microwave lens/seal assembly, a microwave transceiver assembly, a controller/processor assembly, and a computer. In accordance with preferred embodiments of the invention, the only portion of the system that is permanently secured to the tank car is the lens/seal assembly. The microwave transceiver assembly is adapted to be releasably attached to the tank car and the controller/processor assembly and the computer may be located at a loading/unloading facility.

The lens/seal assembly is permanently affixed to the tank car in sealing relationship with an opening formed in a fitting that communicates with an upper portion of the tank car, such as the manway nozzle or the siphon and air vent nozzle. A lens is positioned in facing relationship with the surface of the material contained in the vessel.

A microwave transceiver assembly is attached to the lens/seal assembly in a manner that permits it to be releasably connected thereto when in use and disconnected therefrom when not in use. The transceiver assembly emits microwave signals through the lens toward the surface of the material and receives microwave signals reflected from the surface through the lens. The transceiver assembly includes a probe member in facing relationship with the lens and means for aligning the probe member relative to the lens. The lens/seal assembly is provided with a cover member that is received in covering relationship with the opening that communicates with the lens when the transceiver assembly is disconnected.

In accordance with a preferred embodiment of the invention a wave guide member is provided that extends into the tank car and has an open upper end portion that is in facing relationship with the lens. The lower end portion of the wave guide member extends towards the bottom of the tank car and is in fluid communication therewith. A plurality of mode killing baffle plates may be positioned in the wave guide member. The lens/seal assembly and the wave guide member are preferably welded together and secured as an assembly to the tank car by a connecting ring that is welded to the wave guide member.

In accordance with an alternative embodiment of the invention the lens/seal assembly communicates with the interior of the tank car through a ball valve member.

The controller/processor assembly is preferably located at the loading/unloading facility and is operatively connected to the transceiver assembly through a cable extending therebetween. The controller/processor assembly controls the emission of the microwave signals and determines from the reflected microwave signals the distance between the transceiver assembly and the surface of the material in the vessel. A computer is operatively connected to the controller/processor assembly for receiving a signal from the controller/processor assembly indicative of the above mentioned distance. The computer may be programmed to terminate the loading or unloading of the tank car to activate an alarm when the level and/or quantity of material in the tank car reaches a predetermined value. The computer is preferably programmed to calibrate the distance measured by the controller/processor assembly to correspond to a particular level and/or quantity designation associated with a plurality of differently configured tank cars. The computer may also be programmed to provide inventory data and billing information.

In accordance with the method of the invention, the level and/or quantity of a flowable loading material contained in a tank car is monitored at a loading/unloading facility. A microwave lens/seal assembly is permanently affixed to the tank car in sealing relationship with an opening provided in the tank car and in facing relationship with the surface of the lading in the tank car. The tank car is transported to a loading/unloading facility. The microwave transceiver assembly is attached to the lens/seal assembly. The controller/processor assembly controls the transceiver assembly to emit microwave signals through the lens/seal assembly toward the surface of the loading and to receive reflected microwave signals from the surface of the loading through the lens/seal assembly so as to determine the distance between the transceiver assembly and the surface of the loading. A computer assembly, that is operatively connected to the controller/processor assembly, receives a signal that is indicative of the determined distance, which signal may be utilized to determine level and/or quantity of the lading in the tank car. The computer may be programmed to terminate the loading and unloading of the tank car and/or sound an alarm when a preselected level and/or quantity of lading in the tank car is reached. The computer may also be utilized to generate various business data and reports. Upon completion of the loading or unloading of the tank car the microwave transceiver assembly is disconnected for use on another tank car and the tank car is transported away from the loading/unloading facility.

BRIEF DESCRIPTION OF THE DRAWINGS

The accompanying drawings which are incorporated in and constitute a part of the specification, illustrate preferred embodiments of the invention and together with the general description given above and the detailed description of preferred embodiments given below, serve to explain the principles of the invention.

DESCRIPTION OF THE PREFERRED EMBODIMENTS

Figure 1:
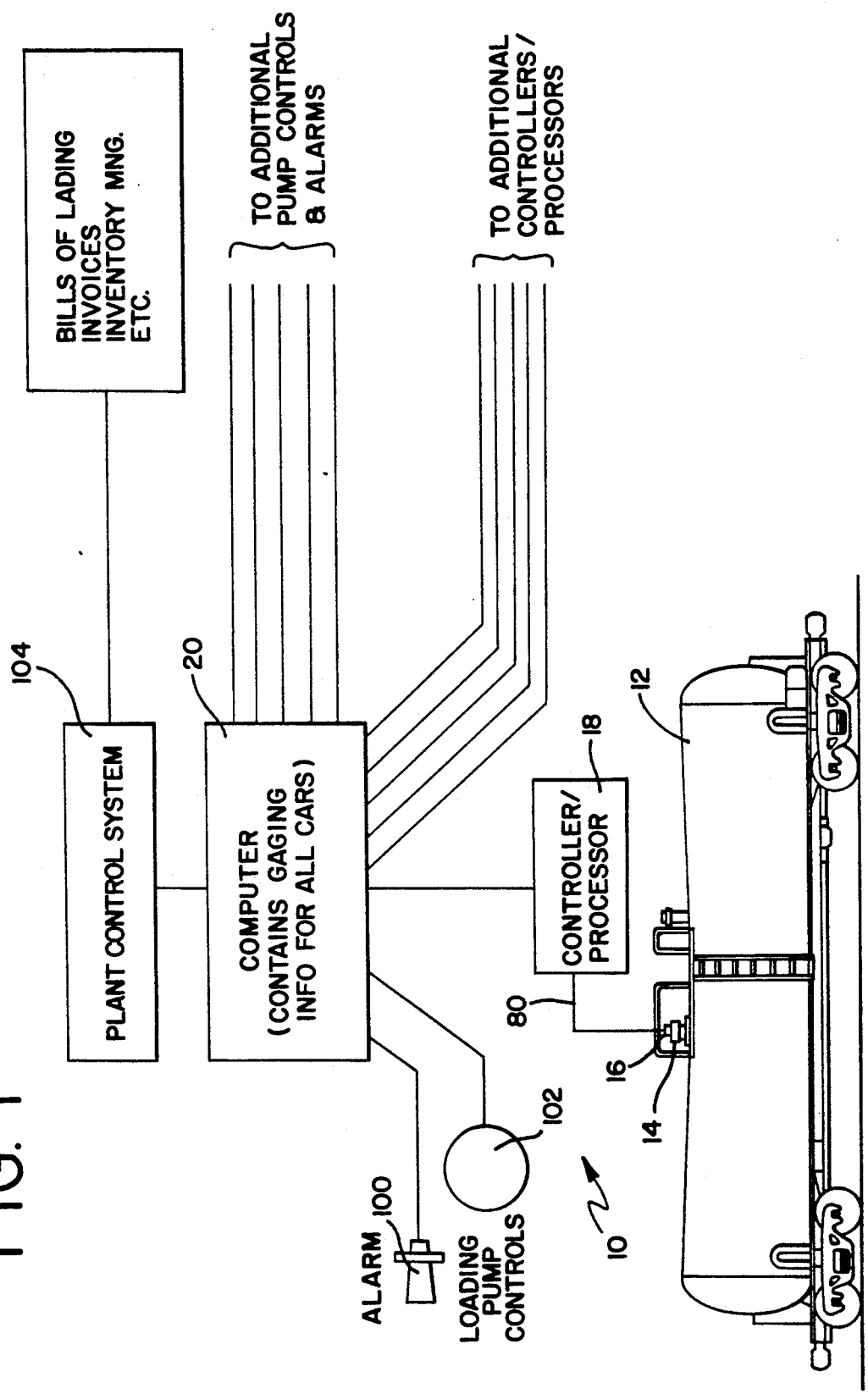
FIG. 1 is a schematic representation of a system for monitoring the level of flowable material in a railway tank car in accordance with the invention.

Referring now to the drawings, wherein like reference numerals designate like or corresponding parts throughout the several views, there is shown in FIG. 1 a schematic presentation of a system 10 for monitoring the level and/or quantity of a flowable material or lading contained in a transportable vessel or railway tank car 12. System 10 comprises a tank car 12 that is adapted to be loaded and unloaded at a dedicated loading/unloading facility as is well known in the art. The tank car is transported to the facility where it is loaded or unloaded and transported from the facility back into service. During the loading and unloading of the tank car it is necessary to monitor the level of the lading in order to determine when the car is empty and to prevent the car from being overfilled. System 10 utilizes generally known microwave level detection technology to continuously monitor the lading level in the tank car as it is being loaded and unloaded.

Figure 2:
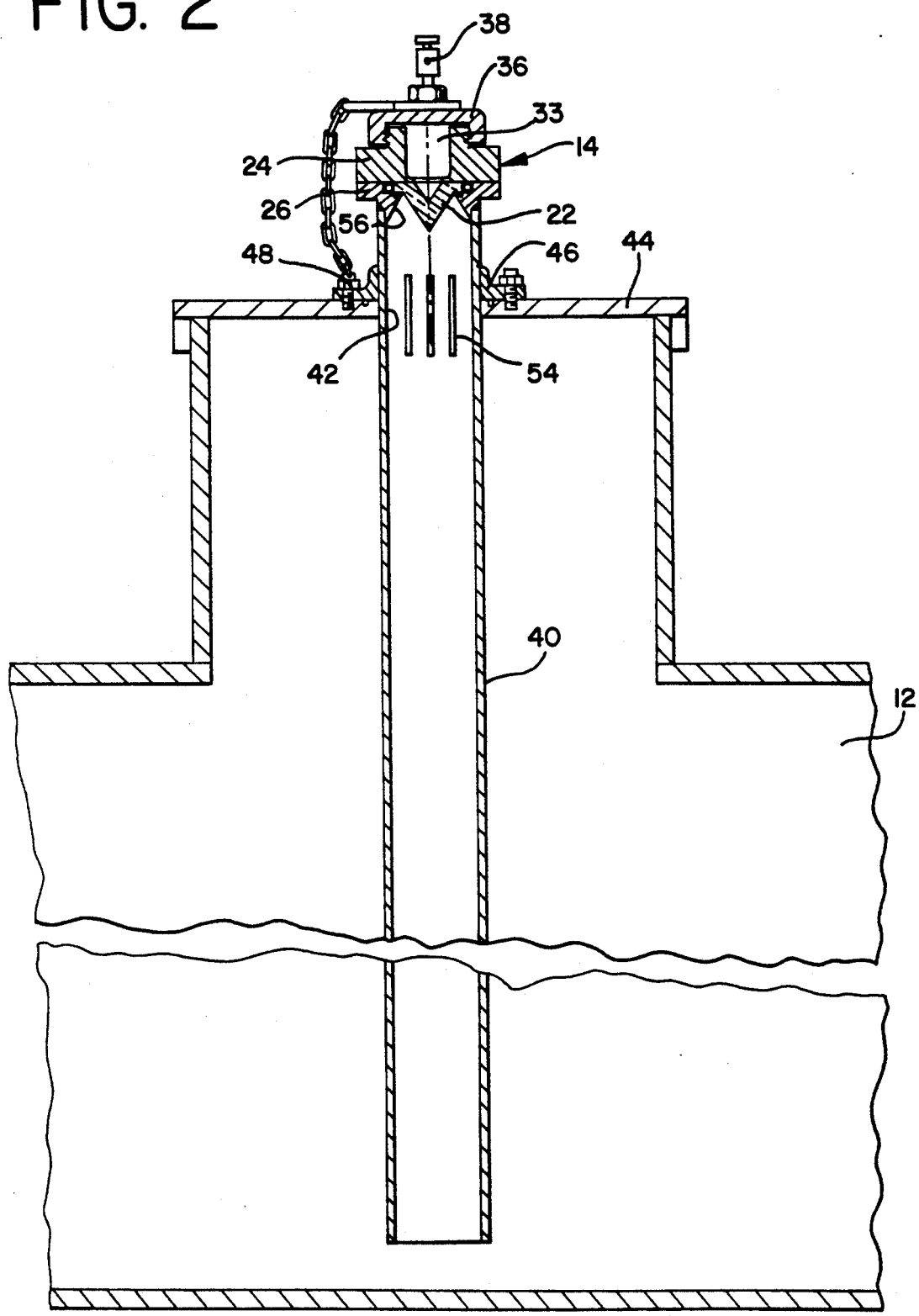
FIG. 2 is a sectional view taken through a portion of a railway tank car showing the attachment of a microwave lens/seal assembly, wave guide member and a cover member to a tank car in accordance with a preferred embodiment of the invention.
Figure 3:
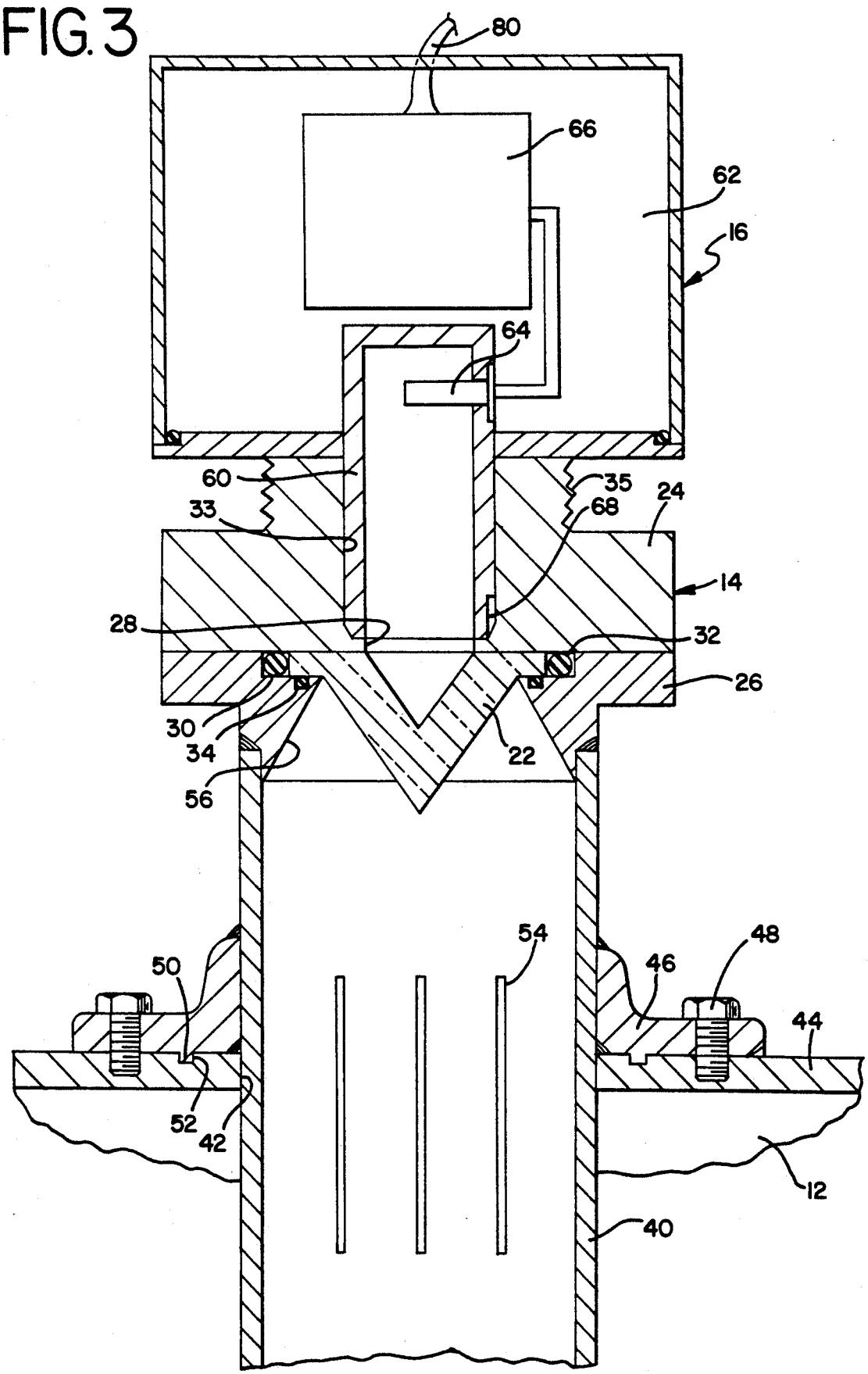
FIG. 3 is an enlarged sectional view of the embodiment shown in FIG. 2 with the cover member removed and a microwave transceiver assembly attached thereto.

Referring to FIGS. 1-3, system 10 includes a microwave lens/seal assembly 14, a transceiver assembly 16, a controller/processor assembly 18, and a computer 20. Microwave lens/seal assembly 14 includes a lens or process seal 22 through which microwave signals pass with a minimum amount of reflection and a minimum amount of attenuation. The particular design and construction of the lens 22 is not critical to the invention and does not form a part thereof. Lens 22 may take various configurations and be constructed of various materials as are well known in the art.

A transceiver assembly 16 is releasably attached to the lens/seal assembly 14 in a manner that will be further discussed hereinbelow. Transceiver assembly 16 includes a microwave emitter/receiver unit 64. A continuously running oscillator unit 66 drives the emitter/receiver unit. During a measurement, the oscillator frequency is swept or varied to drive the emitter/receiver unit and produce a low-level microwave beam directed towards the material in the tank car. The emitter/receiver unit receives the reflected signal which is filtered, mixed and amplified in the oscillator unit to produce an audio frequency signal representative of the distance between the emitter/receiver unit and the surface of the material in the tank car, as is known. A suitable transceiver assembly is generally of the type utilized in the above mentioned CannonBear 1001 Microwave Level Transmitter.

The controller/processor assembly 18 is located remote from the transceiver assembly 16 and is connected thereto. The controller/processor assembly 18 is preferably located at the loading/unloading facility.

As is known, the controller/processor assembly 18 includes circuitry for analyzing the audio signal to produce information therefrom representative of the time for the transmitted signal to return to the emitter/receiver unit and thereby provide information which is capable of being analyzed to determine the distance of the surface of the lading in the tank car from the emitter/receiver unit. The level of the lading is a function of its distance from the emitter/receiver unit.

The electronics of the controller/processor assembly 18 may also be generally of the type utilized in conjunction with the previously mentioned CannonBear 1001 Microwave Level Transmitter. It is also contemplated within the scope of the present invention that other signal processing and analysis techniques could be used in conjunction with the microwave level sensing. The particular microwave level techniques do not form part of the present invention.

The output of the controller/processor assembly 18 is communicated to a centralized computer 20, which is also preferably located at the loading/unloading facility, for processing the data in accordance with information required. For example, the output of the controller/processor assembly, which is conveniently indicative of the time and/or distance measurement, can be processed in the computer with information indicative of the amount of material in the tank car, as function of a distance, to provide an output representative of the quantity of material in the tank car and for otherwise controlling the loading and unloading operation. As is evident, such information can also be utilized for the purpose of inventory control, billing and any other appropriate purpose for which the information relating to the quantity of material disposed within the tank car can be used.

Advantageously, the computer 20 may be similarly connected to the controller/processor assemblies for a number of different transceiver assemblies to facilitate contemporaneous control, sensing, loading and unloading of, and monitoring of the lading level in a variety of tank cars or similar transportable vessels with which the system of the present invention is designed. The computer also may be utilized to control the operation of various pumping means for each of the transportable vessels to control the loading and unloading thereof and to provide information about the amount and quantity of materials disposed in each vessel. This information may be based on information stored in the computer relating to the size and configuration of each type of vessel which can be identified to provide for conversion of the time and distance data to quantity of material within the vessel.

Referring to FIGS. 2 and 3, a preferred embodiment of a separable microwave assembly used to monitor the level and/or quantity of flowable material or lading, in accordance with the invention, is shown attached to a railway tank car 12. The microwave assembly includes a microwave lens/seal assembly 14 and a microwave transceiver assembly 16.

Lens/seal assembly 14 includes a lens 22 of suitable configuration and material as is known in the art. The lens 22 is positioned between an upper support member 24 and a lower support member 26. Support members 24 and 26 are provided with centrally disposed openings 28 and 30 respectively and lens 22 is disposed in covering relationship thereto. Suitable seal members 32 and 34 are provided to seal lens 22 in closing relationship to opening 30. Support members 24 and 26 are secured together by suitable fasteners (not shown) extending therethrough.

As best seen in FIG. 2, upper support member 24 defines a recess or socket 33 that communicates with opening 28 in facing relationship to lens 22. The upper portion of member 24 is threaded at 35 for selective receipt of a threaded cover member 36 in covering relationship with recess 33. Cover member 36 is provided with a telltale assembly 38 as is well known in the art.

Lens/seal assembly 14 communicates with the interior of the tank car through a wave guide member 40 that extends through an opening 42 in a flange 44 associated with a suitable fitting such as a manway nozzle or a siphon and air vent nozzle. As best seen in FIG. 2, wave guide member 40 is a tubular member that has an open lower end portion that communicates with a lower section of the tank car and open upper end portion that is attached to lower support member 26 in facing relationship to lens 22. The upper edge of member 40 extends through opening 42 and is preferably welded to lower support member 26. Wave guide member 40 is secured to flange 44 through a connecting ring 46 having a vertical flange portion that is welded to member 40 and a horizontal flange portion that is connected to flange 44 by bolts 48. The horizontal flange portion may be provided with an annular tongue 50 that is received in an annular groove 52 formed in flange 44 having a sealing gasket (not shown) therein. Mode killing baffles 54 may be provided within wave guide member 40. The lower support member 26 is preferably provided with an annular portion that defines a horn portion 56 to direct microwaves passing through lens 22 towards the surface of the lading in the tank car and to direct reflected microwaves back through the lens 22.

Referring to FIG. 3, transceiver assembly 16 includes a probe member 60 and a transmit/receiver unit 62. Probe 60 is a generally cylindrical member having an open bottom end. Probe 60 is slidably received in recess 33 with its open bottom end in facing relationship to lens 22. Transmit/receiver unit 62 includes the microwave emitter/receiver unit 64 that extends into probe 60 and the microwave oscillator unit 66 that is operatively connected thereto. Probe 60 is preferably provided with a means to align the probe 60 in recess 33 and properly polarize the microwave transmission and reception with the lens/seal assembly 14. The probe may be provided with a key guide 68 that cooperates with a key formed in the recess 33. Transceiver assembly 16 is operatively connected to controller/processor by a flexible cable 80.

Figure 4:
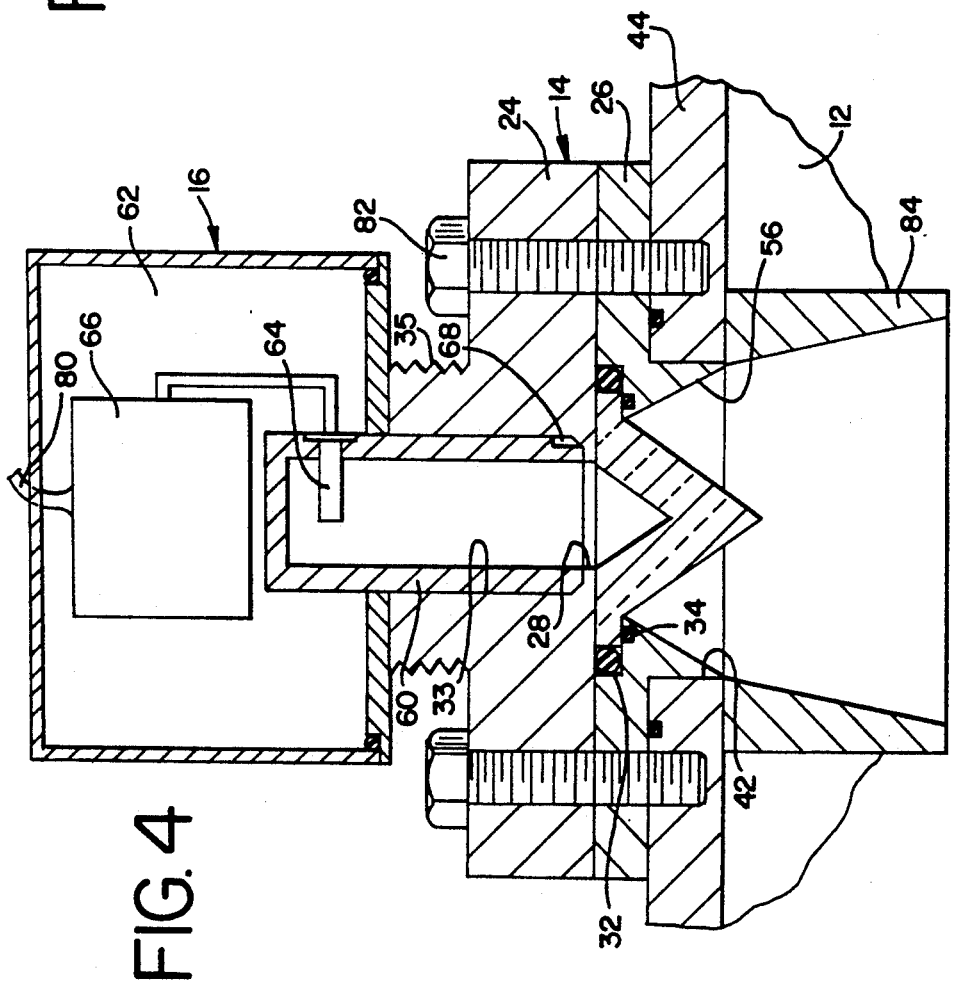
FIG. 4 is a sectional view similar to FIG. 3 showing an alternative embodiment of the invention.

Referring to FIG. 4, an alternative embodiment of the invention is shown wherein the lower support member 26 is secured directly to the flange 44 by fasteners 82 extending through members 24 and 26 and into flange 44. In this embodiment the wave guide member 40 is replaced by a directional shroud/horn member 84 that extends a short distance into tank car 12. Lens/seal assembly 14 and transceiver assembly 16 are substantially the same as shown in FIGS. 3 and 4.

Figure 5:
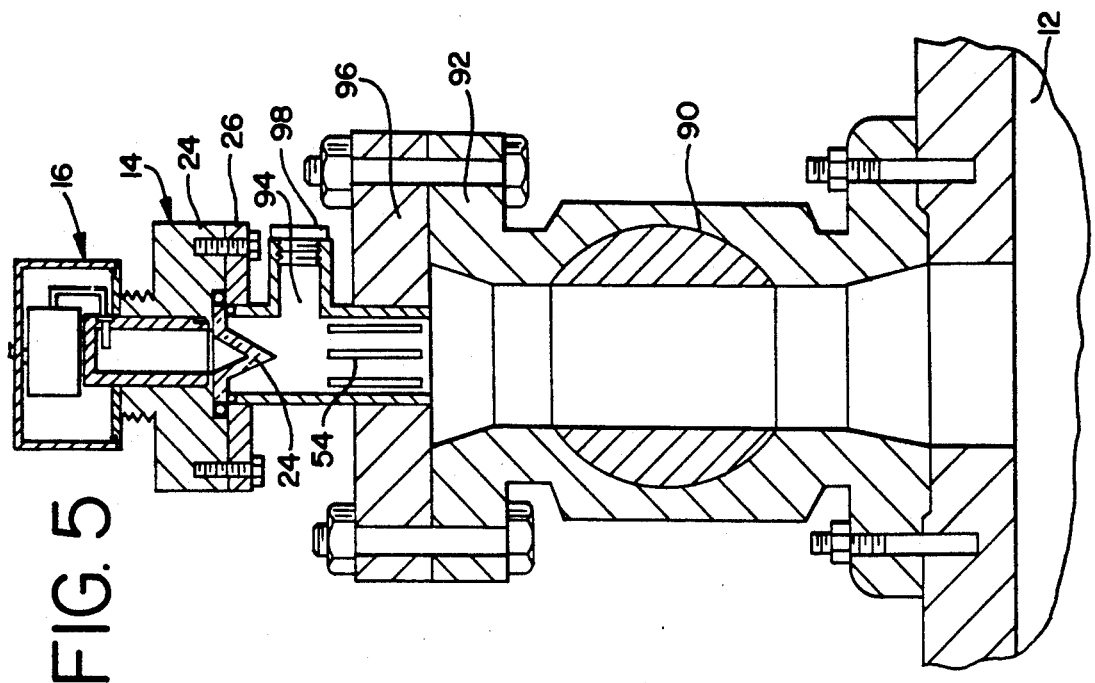
FIG. 5 is a sectional view similar to FIG. 3 showing another alternative embodiment of the invention.

Referring to FIG. 5, another alternative embodiment of the invention is shown wherein the lens/seal assembly 14 and the transceiver assembly 16 are affixed to a ball valve 90 mounted vertically on top of the tank car. This embodiment may be particularly applicable to the retrofitting of older tank cars that have limited space in which to mount the lens/seal assembly 14. Lens/seal assembly 14 and transceiver assembly 16 are substantially the same as shown in FIGS. 3 and 4. Assembly 14 is attached to the upper flange 92 of valve 90 through a pipe tee 94 and a connecting flange 96. The horizontal leg portion of pipe tee 94 is provided with a closing plug 98. Transceiver assembly 16 communicates with the inside of tank car 12 through lens 22, the vertical leg portion of pipe tee 94 and ball valve 90. Mode killing baffles 54 may be provided within the vertical leg portion of pipe tee 94.

The function and operation of controller/processor 18 and computer 20 has been previously described. The specific construction of these components does not form part of this invention.

Referring to FIG. 1, computer 20 is operatively connected to a suitable alarm system 100 and a suitable loading pump system 102 that controls the loading and unloading of the tank cars. The computer operatively communicates with a plurality of controller/processors 18, alarm systems 100 and pump systems 102, to permit a plurality of tank cars to be simultaneously loaded and/or unloaded. The computer also operatively communicates with a suitable plant control system 104 that receives information from the computer and generates required business documents and reports.

The discussion of the method and operation of the system that herein below follows is applicable to all of the above described embodiments. One or more railway tank cars are transported to the loading/unloading facility to be either filled with a flowable material or emptied of a flowable material. The tank cars have a microwave lens/seal assembly 14 permanently affixed thereto in accordance with one of the above described embodiments of the invention. The outlet/inlet valve of the tank car is connected to an outlet/inlet line in a well known manner. A transceiver assembly 16 is attached to the lens/seal assembly 14 by inserting the probe 60 into the recess 33. As the lading is directed into the tank car or withdrawn therefrom the transceiver assembly 14 and the controller/processor assembly 18 monitor the level of the lading in the tank car as a function of its distance from the transceiver assembly in the herein above described manner. When the computer 20 determines that the tank car is either full or empty, the pump controls 102 and/or the alarm 100 may be appropriately activated. A plurality of cooperating transceiver assembly 16 and controller/processor assembly 18 combinations may be simultaneously operatively connected to a corresponding lens/seal assembly 14 attached to a plurality of tank cars. Upon completion of the loading or unloading procedure, the transceiver assembly 16 is disconnected from the lens/seal assembly 14, cover member 36 is secured in place, and the tank car is transported away from the loading/unloading facility.

The computer 20 processes the data received from the controller/processor assemblies 18 in accordance with the operational and business information that may be required. The computer 20 may process the time and/or distance measurement received from the controller/processor assembly to determine the quantity of material either loaded into the tank car or unloaded therefrom. This information may be directed to a plant control system 104 to generate bills of lading, invoices, inventory management reports or other desired documents or reports.

The method and apparatus of the present invention utilizes known microwave gauging technology in a unique manner to economically, accurately and reliably monitor the level of flowable material in a transportable vessel, such as a railway tank car or the like. The only portion of the system that is permanently attached to the vessel is the lens/seal assembly 14. In so doing, the cost to modify new or existing vessels to utilize the system is minimized and the reliability of the system is increased because the delicate components of the system do not encounter the rough elements associated with the transportation of the vessel.

Although the invention has been described in terms of the specified embodiments which are not set forth in detail, it should be understood that this is by illustration only and that the invention is not limited thereto, since alternative embodiments and operating techniques will become apparent to those skilled in the art in view of the disclosure. Accordingly, modifications are contemplated which can be made without departing from the spirit of the described invention.

What is claimed is:

1. A method of successively monitoring selected ones of the level and quantity of flowable material contained in a plurality of transportable vessels located at a loading/unloading facility, comprising the steps of:

(a) providing a plurality of like microwave lens/seal assemblies, each being permanently affixed to one of the vessels in sealing relationship with an opening provided therein and in facing relationship with the surface of the material contained therein;
    (b) successively transporting each of the vessels to the loading/unloading facility;
    (c) releasably attaching to each of the vessels a microwave transceiver assembly that emits microwave signals through the lens/seal assembly affixed to that vessel toward the surface of the material and that receives reflected microwave signals from the surface of the material through the lens/seal assembly;
    (d) providing a controller/processor assembly operatively connected to the transceiver assembly for controlling the emission of the microwave signals and for determining from the reflected microwave signals the distance between the transceiver assembly and the surface of the material in the vessel to which the transceiver assembly is releasably attached;
    (f) disconnecting the microwave transceiver assembly from each of the vessels; and
    (g) transporting each of the vessels away from the loading/unloading facility.

2. The method as defined in claim 1 further including the step of using the distance determined in step (d) for a particular vessel to determine selected ones of the level and quantity of material in the vessel.

3. The method as defined in claim 1 further including the step of providing a computer assembly that is operatively connected to the controller/processor assembly for receipt of a signal from the controller/processor assembly indicative of the distance determined in step (d) to determine selected ones of the level and quantity of material in the vessel.

4. The method as defined in claim 3 further including the step of providing control means for controlling the loading and unloading of each of the vessels operatively connected to the computer assembly so as to automatically terminate the loading or unloading of each of the vessels when selected ones of the level and quantity of material reaches a preselected value.

5. The method as defined in claim 3 wherein the computer assembly is programmed to automatically calibrate the distance determined in step (d) to a corresponding selected one of the level and volume for each of a plurality of differently configured vessels.

6. The method as defined in claim 3 wherein the computer assembly is in communication with an alarm assembly to activate the alarm assembly and provide selected combinations of visual and audible warnings when the selected ones of the level and quantity of material in the vessel reaches a preselected value.

7. The method as defined in claim 3 wherein the computer assembly is programmed to provide inventory data.

8. The method as defined in claim 3 wherein a plurality of cooperating controller/processor assembly and transceiver assembly combinations are operatively connected to the computer assembly.

9. The method as defined in claim 1 wherein the transportable vessel is a railway tank car.

10. A system for successively monitoring the selected ones of the level and quantity of flowable material contained in a plurality of transportable vessels located at a loading/unloading facility, said system comprising:

(a) a plurality of microwave lens/seal means each being adapted to be permanently affixed to a different one of a plurality of transportable vessels in sealing relationship with an opening provided therein and in facing relationship with the surface of the material contained therein;

(b) a microwave transceiver means adapted to be releasably attached to successive ones of the plurality of vessels for emitting microwave signals through the lens/seal means permanently affixed to that vessel toward the surface of the material therewithin and for receiving reflected microwave signals from the surface of the material through the lens/seal assembly; and (c) a controller/processor assembly means operatively connected to said transceiver assembly means for controlling the emission of the microwave signals and for determining from the reflected microwave signals the distance between the transceiver assembly and the surface of the material in the vessel.

11. The system as defined in claim 10 wherein said system includes a computer means operatively connected to the controller/processor assembly for receiving a signal from the controller/processor assembly means indicative of said distance and determining selected ones of the level and quantity of material in the vessel.

12. The system as defined in claim 11 including a control means for controlling the loading and unloading of each of the plurality of vessels operatively connected to the computer means so as to automatically terminate the loading or unloading of each of the vessels when selected ones of the level and quantity of material reaches a preselected value.

13. The system as defined in claim 11 wherein said computer means is programmed to calibrate said distance to a selected one of the level and quantity designation for each of a plurality of differently configured vessels.

14. The system as defined in claim 11 wherein said computer means is operatively connected to an alarm means to activate said alarm and provide a visual and/or audible warning when selected ones of the level and quantity of material reaches a preselected level.

15. The system as defined in claim 11 wherein the computer means is programmed to provide inventory data.

16. The system as defined in claim 11 wherein a plurality of controller/processor means and cooperating transceiver means are operatively connected to said computer means.

17. The system as defined in claim 10 wherein said vessel is a railway tank car.

18. A separable microwave assembly for use in monitoring selected ones of the level and quantity of flowable material contained in each of a plurality of transportable vessels, said assembly comprising:

(a) a microwave lens/seal support means adapted to be permanently mounted to each of a plurality of vessels, each of said support means including a lens/seal means in sealing relationship with an opening in one said vessel in facing relationship with the surface of the material contained in said vessel; and (b) a microwave transceiver means adapted to be releasably connected and disconnected to said support means of each of a plurality of vessels for emitting microwave signals through said lens/seal means toward the surface of the material and for receiving reflected microwave signals from the surface of the materials through said lens/seal assembly.

19. The assembly as defined in claim 18 wherein said support means includes an upper support member having a centrally disposed opening therein and a lower support member having a centrally disposed opening therein, said lens/seal means being positioned between said upper and lower support members in closing relationship with the openings formed therein.

20. The assembly as defined in claim 19 wherein seal means is positioned between said upper and lower support members.

21. The assembly as defined in claim 19 wherein said microwave transceiver means is releasably connected to said upper support member.

22. The assembly as defined in claim 21 wherein said microwave transceiver means includes a probe member that extends into a recess portion formed in each of said upper support members, said probe member having an open bottom portion in facing relationship to said lens/seal means to which it is connected.

23. The assembly as defined in claim 22 including alignment means for aligning said probe member to properly polarize the microwave transmission and reception with said microwave lens/seal support means.

24. The assembly as defined in claim 19 wherein each of said upper support members is provided with means to receive a cover member in covering relationship with said opening formed therein when said transceiver means is disconnected from said support means.

25. The assembly as defined in claim 24 wherein each of said upper support members is provided with a threaded portion that is received by a cooperating threaded portion associated with said cover member.

26. The assembly as defined in claim 19 further including a wave guide member associated with each said microwave lens/seal support means and having an open upper end portion connected to said lower support member in facing relationship with said lens/seal means and lower end portion that extends into said vessel so the level of material in said wave guide member corresponds to the level of material in said vessel.

27. The assembly as defined in claim 26 wherein said upper end portion of said wave guide member extends through said opening in said vessel and is attached to said lower support member.

28. The assembly as defined in claim 27 including a connecting ring member having a vertical flange portion that is welded to said upper end portion of said wave guide member and a horizontal flange portion that is releasably secured to said vessel.

29. The assembly as defined in claim 19 wherein said lower support member defines a horn portion to direct microwaves passing through said lens/seal means towards the surface of the material contained in said vessel.

30. The assembly as defined in claim 19 wherein said lower support member is provided with an annular portion that extends into said opening in said vessel.

31. The assembly as defined in claim 30 wherein said annular portion defines a horn portion to direct microwaves passing through said lens/seal means towards the surface of the material contained in said vessel.

32. The assembly as defined in claim 31 wherein a wave guide member extends into said vessel, said wave guide member has an open upper end that communicates with said horn portion and an open lower end that faces the surface of the material in said vessel.

33. The assembly as defined in claim 19 wherein said opening in said vessel communicates with said lens/seal means through an open port in a valve member.

34. The assembly as defined in claim 33 wherein said valve member is a ball valve.

* * * * *